(12) United States Patent
Tamura

(10) Patent No.: US 8,672,080 B2
(45) Date of Patent: Mar. 18, 2014

(54) VIBRATION SOURCE ATTACHMENT STRUCTURE FOR VEHICLES

(75) Inventor: Tsutomu Tamura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/259,808

(22) PCT Filed: Jul. 21, 2010

(86) PCT No.: PCT/JP2010/062245
§ 371 (c)(1),
(2), (4) Date: Oct. 18, 2011

(87) PCT Pub. No.: WO2011/013554
PCT Pub. Date: Feb. 3, 2011

(65) Prior Publication Data
US 2012/0118660 A1 May 17, 2012

(30) Foreign Application Priority Data
Jul. 29, 2009 (JP) ................ P2009-176876

(51) Int. Cl.
*B60K 5/00* (2006.01)

(52) U.S. Cl.
USPC ...... 180/291; 180/312; 267/140.11; 296/35.1

(58) Field of Classification Search
USPC ........ 180/291, 312; 267/136, 140.11, 140.13, 267/141.2; 296/35.1
See application file for complete search history.

(56) References Cited

U.S. PATENT DOCUMENTS

| 2,196,428 | A | * | 4/1940 | Saurer ................ 267/140.4 |
| 3,209,851 | A | * | 10/1965 | Collins ................ 180/292 |
| 3,525,548 | A | * | 8/1970 | Mutka ................ 296/35.1 |
| 3,841,426 | A | * | 10/1974 | Nemschoff ............ 180/53.1 |
| 3,845,923 | A | * | 11/1974 | Atkinson ............... 248/635 |
| 4,240,517 | A | * | 12/1980 | Harlow et al. ........... 180/295 |
| 4,669,711 | A | * | 6/1987 | Beer .................. 267/140.13 |
| 4,905,956 | A | * | 3/1990 | Zemlicka et al. ......... 248/562 |
| 5,221,078 | A | * | 6/1993 | Hartel et al. ............ 267/140.14 |
| 5,249,782 | A | * | 10/1993 | Ide et al. ............... 267/140.14 |
| 5,280,886 | A | * | 1/1994 | Gartner et al. .......... 267/140.13 |
| 5,580,028 | A | * | 12/1996 | Tomczak et al. ......... 248/634 |
| 5,947,455 | A | * | 9/1999 | Mikasa et al. .......... 267/140.13 |

(Continued)

FOREIGN PATENT DOCUMENTS

JP 11-190383 A 7/1999
JP 2006-052740 A 2/2006

*Primary Examiner* — Paul N Dickson
*Assistant Examiner* — Timothy Wilhelm
(74) *Attorney, Agent, or Firm* — Carrier Blackman & Associates, P.C.; Joseph P. Carrier; William D. Blackman

(57) ABSTRACT

Disclosed is a vibration source attachment structure equipped with a vibration isolation device. In the vibration source attachment structure, the vibration source (41) of an engine, or the like, is attached via the vibration isolation device (50) to a subframe (30) that has been attached in a downward position with respect to a vehicle body frame (20). The vibration isolation device (50) is provided with a first attachment (51) that attaches to the vibration source (41), a second attachment (52) that attaches to the subframe (30), and an elastic body (53) that connects the first and second attachments (51, 52). The subframe (30) is provided with fitting holes (31) that are formed in the vertical direction of said subframe. The second attachment (52) is detachably attached to the fitting holes (31) by means of press fitting.

6 Claims, 4 Drawing Sheets

(56) References Cited

U.S. PATENT DOCUMENTS

| | | | |
|---|---|---|---|
| 5,967,500 A * | 10/1999 | Satori et al. | 267/140.13 |
| 6,029,961 A * | 2/2000 | Meyerink et al. | 267/140.12 |
| 6,820,908 B1 * | 11/2004 | Tousi et al. | 296/35.1 |
| 7,918,438 B2 * | 4/2011 | Sato et al. | 267/140.13 |
| 7,926,609 B2 * | 4/2011 | Kusaka | 180/232 |
| 2004/0150145 A1 * | 8/2004 | Tewani et al. | 267/140.14 |
| 2004/0201150 A1 * | 10/2004 | Okanaka et al. | 267/140.11 |
| 2006/0097435 A1 * | 5/2006 | Yoneyama et al. | 267/140.11 |
| 2007/0052142 A1 * | 3/2007 | Muraoka | 267/140.11 |
| 2007/0057421 A1 * | 3/2007 | Nanno et al. | 267/140.13 |
| 2007/0262502 A1 * | 11/2007 | Okanaka et al. | 267/140.11 |
| 2008/0023897 A1 * | 1/2008 | Muraoka | 267/140.11 |
| 2009/0273127 A1 * | 11/2009 | Goudie | 267/140.5 |
| 2010/0148413 A1 * | 6/2010 | Lee | 267/140.11 |

* cited by examiner

VIBRATION SOURCE ATTACHMENT STRUCTURE FOR VEHICLES

TECHNICAL FIELD

The present invention relates to a vibration source attachment structure for mounting a vibration source to a subframe of a vehicle.

BACKGROUND ART

Vibration isolation devices in vibration source attachment structures prevent vibrations produced by an engine or other vibration source from being transmitted to the subframe by absorbing these vibrations. Such vibration source attachment devices are known, as proposed, for example, in Patent Literature 1.

The vibration source attachment structure disclosed in Patent Document 1 has a vehicle body frame extending in a longitudinal or front-rear direction of the vehicle body, a subframe disposed below the vehicle body frame, and an engine attached to the subframe via a vibration isolation device. A flange (engine mount bracket) of the vibration isolation device is disposed on an attachment base provided on the subframe, and the vibration isolation device is attached to the subframe by bolting the flange to the attachment base.

Because of such a structure, more time is required to install and dismantle the subframe on the vehicle body frame as part of the maintenance operation involved in servicing, inspecting, and replacing the vibration isolation device, and improvements are therefore required in terms of the ease of maintenance.

In addition, due to the presence of the attachment base and the flange, the subframe and the vibration isolation device are therefore proportionally heavier, and result in a disadvantage in terms of minimizing the subframe resonance caused by the vibrations of the vibration source. The vibrations transmitted from the subframe to the vehicle body frame are transmitted to the inside of the vehicle passenger compartment. It is preferable that the vibrations and sound transmitted to the inside of the vehicle passenger compartment be minimized as much as possible in order to increase the riding enjoyment and comfort of the passenger.

PRIOR ART DOCUMENTS

Patent Literature

Patent Document 1; Japanese Patent Application Laid-Open Publication No. 2006-52740

SUMMARY OF INVENTION

Technical Problem

An object of the present invention is to provide a technique capable of improving the efficiency in maintaining a vibration isolation device and suppressing the resonance and vibrational amplification of a subframe and its periphery.

Solution to Problem

According to one aspect of the present invention, there is provided a vibration source attachment structure comprising a vehicle body frame, a subframe disposed below the vehicle body frame and attached to the vehicle body frame, and an engine or other vibration source attached to the subframe via a vibration isolation device, characterized in that the vibration isolation device has a first attachment part attached to the vibration source, a second attachment part attached to the subframe, and an elastic body connecting the first attachment part and the second attachment part; the subframe has a fitting hole formed in a vertical direction of the subframe; and the second attachment part is attached to the fitting hole by detachable press-fitting.

The second attachment part preferably has a positioning stopper for positioning the press-fitting direction relative to the subframe during press-fitting into the fitting hole.

The subframe preferably has a detachable retaining stopper for preventing the second attachment part press-fitted into the fitting hole from falling off in a direction opposite to the press-fitting direction.

Advantageous Effects of Invention

In the vibration isolation device of the vibration source attachment structure according to the present invention, the second attachment part for attachment to the subframe is attached to the fitting hole, which is formed in a vertical direction of the subframe, by detachable press-fitting from above or below. In this way, the second attachment part is merely attached to the fitting hole of the subframe by direct press-fitting, and less time is therefore required to install and dismantle the subframe on the vehicle body frame as part of the maintenance operation involved in servicing, inspecting, and replacing the vibration isolation device. As a result, the vibration isolation device can be maintained in good condition with greater ease.

Moreover, an attachment base for attaching the vibration isolation device to the subframe is unnecessary because the second attachment part is merely attached to the fitting hole of the subframe by direct press-fitting. Nor is it necessary for the second attachment part to have a flange for attaching the device (bracket for mounting the vibration source) to the attachment base by bolting. The subframe and the vibration isolation device can be made proportionally more lightweight.

In addition, the attachment base and the flange are thus dispensed with, and hence these members cannot cause resonance or vibrational amplification. Accordingly, the resonance and vibrational amplification of the subframe and its periphery can be minimized for the vibrations generated by the vibration source.

The positioning stopper comes into contact with the subframe when the second attachment part is press-fitted into the fitting hole up to a preset constant position. As a result, the press-fitting direction of the second attachment part can be positioned relative to the subframe. The operator need not pay attention to the position of the press-fitting direction relative to the subframe when the second attachment part is press-fitted into the fitting hole. The vibration isolation device can therefore be maintained in good condition with greater ease.

The second attachment part is prevented from falling off in a direction opposite to the press-fitting direction relative to the fitting hole by the retaining stopper. The second attachment part is therefore prevented from being caused to fall off from the fitting hole by the vibrations generated by the vibration source and the vibrations generated during the running of the vehicle. The state of attachment of the vibration isolation device to the subframe can be maintained for a longer period of time.

DESCRIPTION OF EMBODIMENTS

Certain preferred embodiments of the present invention are described below with reference to the accompanying sheets of drawings.

First Embodiment

Figure 1:
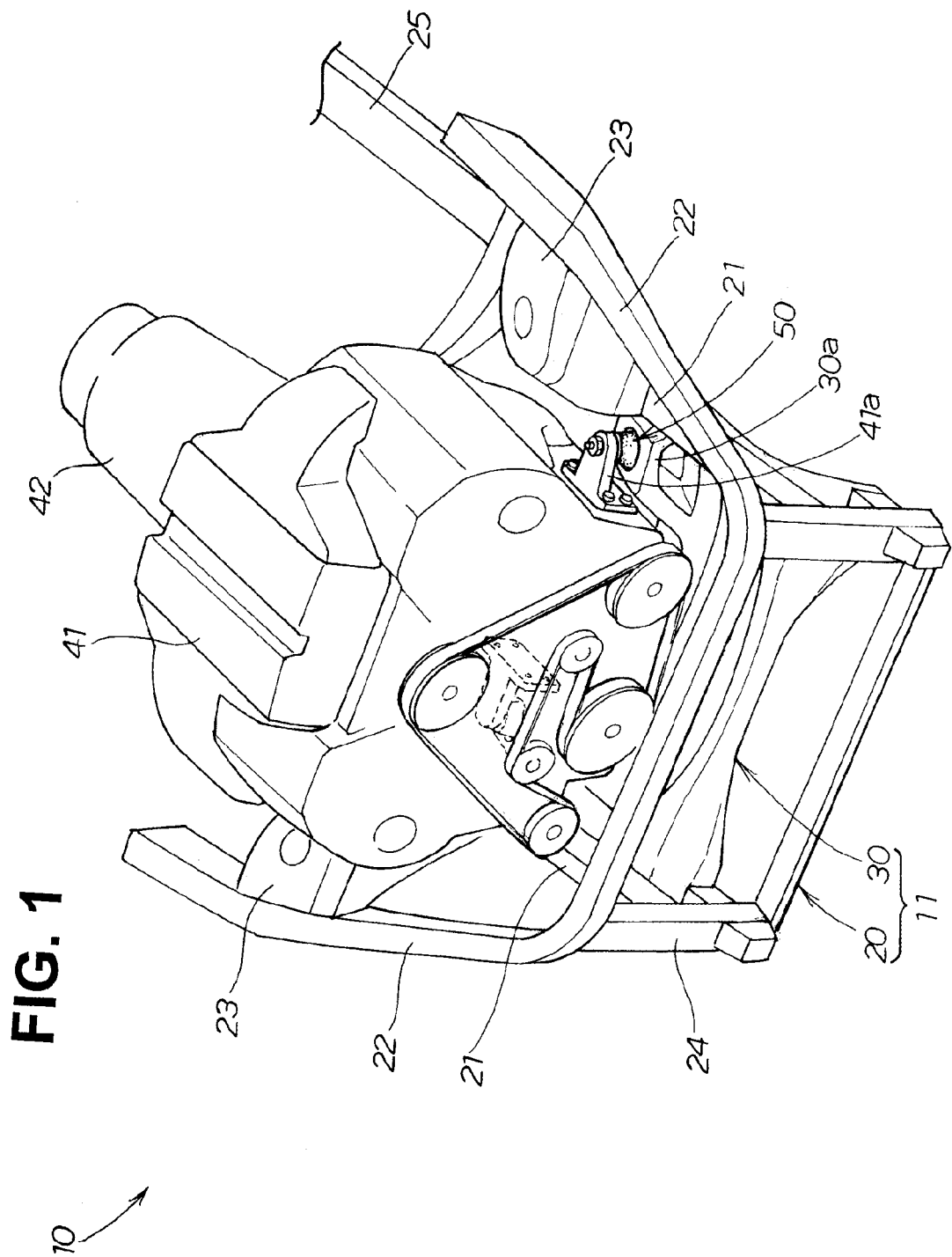
FIG. 1 is a perspective view of the front part of a vehicle having a vibration isolation device according to a first embodiment of the present invention.

A front part of a vehicle body 11 in a vehicle 10 is formed from a vehicle body frame 20, and a subframe 30 attached to a front part of the vehicle body frame 20, as shown in FIG. 1.

The front part of the vehicle body frame 20 includes left and right front side frames 21, 21 extending in a longitudinal or front-rear direction of the vehicle body on both sides of the front part of the vehicle body, left and right upper frames 22, 22 extending to the front and back of the vehicle body above and to the outside, in the vehicle width direction, of the front side frames 21, 21, left and right damper housings 23, 23 spanning between the front side frames 21, 21 and the upper frames 22, 22, and a front bulkhead 24 joined to the front part of the left and right front side frames 21, 21 and the front part of the left and right upper frames 22, 22. The front part of the vehicle body is a monocoque body.

Such a vehicle body frame 20 has a structure in which the subframe 30 is suspended via four front/back/left/right vibration isolation elastic bushings (not shown) from the front part of the left and right front side frames 21, 21, and a front end part of left and right floor frames 25, 25 (shown only on the left side) extending rearward from the back end of the front side frames 21, 21. Specifically, the subframe 30 is attached so as to be suspended from the vehicle body frame 20.

The subframe 30 is formed from a frame having an approximately square shape in a plan view. A longitudinal mounted engine 41 (power source 41) is mounted on a front-half part of the subframe 30, and a transmission 42 is mounted on a back-half part. The engine 41 and the transmission 42 are attached on the subframe 30 via a plurality of vibration isolation devices 50 (only one is shown). The engine 41 and the transmission 42 are one kind of vibration source.

Figure 2:
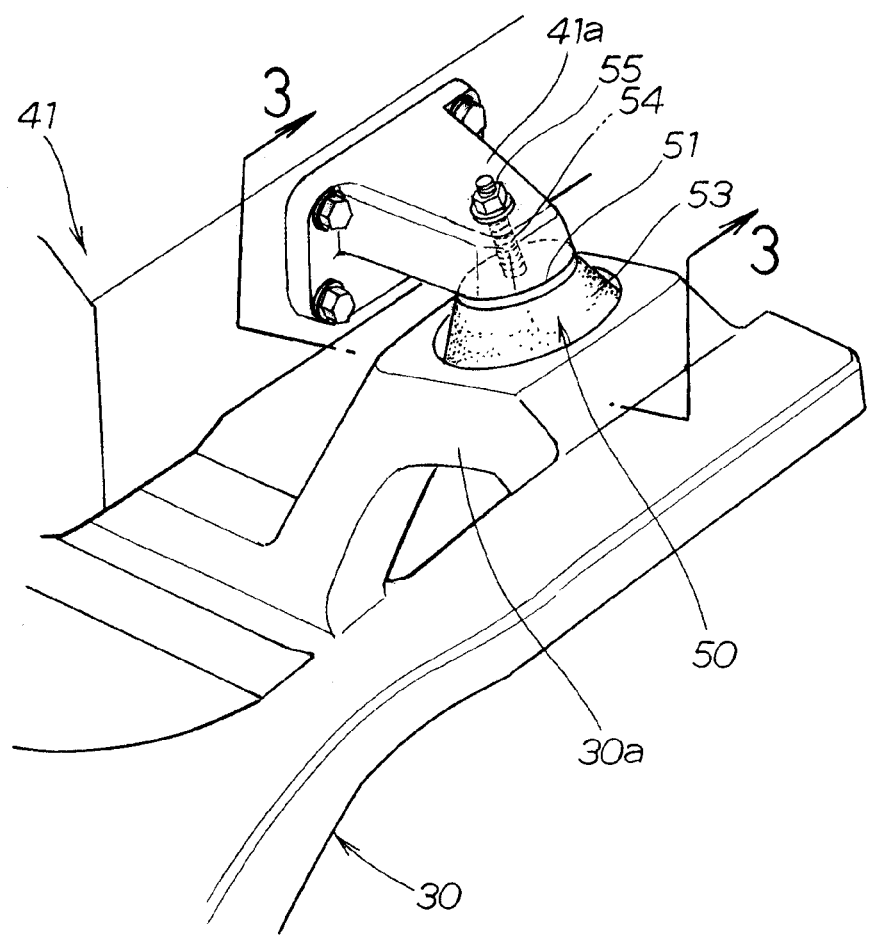
FIG. 2 is a perspective view of the vibration isolation device shown in FIG. 1.

A mount 30a to which the vibration isolation device 50 is attached is integrally formed with a side part of the subframe 30, as shown in FIG. 2. The mount 30a is a part of the subframe 30, and therefore the mount 30a is included when the "subframe 30" is referenced. The vibration isolation device 50 is attached to the mount 30a. An engine bracket 41a of the engine 41 is attached to an upper end part of the vibration isolation device 50. The engine bracket 41a is integrally formed on the engine 41, or attached as a separate member. Hereinafter, the engine bracket 41a is included when the engine 41 is referenced.

Figure 3:
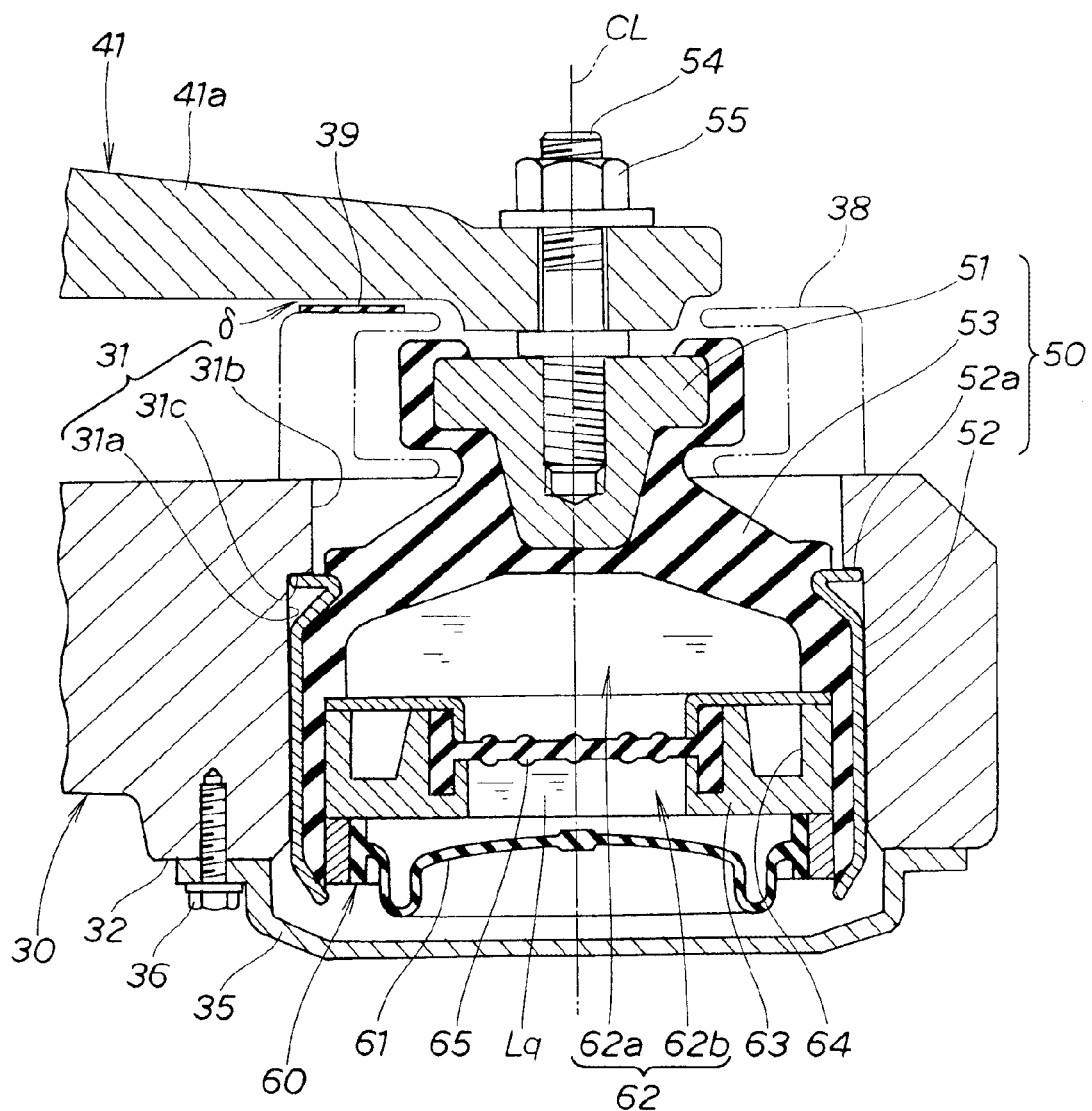
FIG. 3 is an enlarged cross-sectional view taken along line 3-3 of FIG. 2.

The vibration isolation device 50 has a first attachment part 51 attached to the engine 41, a second attachment part 52 attached to the subframe 30, and an elastic body 53 connecting the first attachment part 51 and the second attachment part 52, as shown in FIG. 3. The first and second attachment parts 51, 52 and the elastic body 53 are arranged on the vertical axis CL (center) in the vibration isolation device 50.

The structure of the vibration isolation device 50 is described in detail below.

The first attachment part 51 is attached to the engine bracket 41a of the engine 41. The second attachment part 52 is a cylindrical member to which the elastic body 53 is connected. The first and second attachment parts 51, 52 are formed from steel, aluminum alloy, or other metal material. The elastic body 53 is a rubber block, which is elastically deformable to absorb vibrations transmitted between the first attachment part 51 and the second attachment part 52, and which is formed in a cup shape that is mostly open at the bottom.

A liquid seal structure 60, for example, is provided in a space formed in a lower part of the vibration isolation device 50 by the second attachment part 52 and the elastic body 53. The liquid seal structure 60 may be a well-known construction, and one example is given in the following. Specifically, the liquid seal structure 60 is formed from a diaphragm 61 for blocking the opening at the lower end of the second attachment part 52, a liquid chamber 62 divided into compartments by the elastic body 53 and the diaphragm 61, a dividing member 63 for dividing the liquid chamber 62 into two upper and lower chambers of a main liquid chamber 62a on the side near the elastic body 53 and an auxiliary liquid chamber 62b on the side near the diaphragm 61, an orifice passage 64 provided in the dividing member 63 so that the auxiliary liquid chamber 62b is in communication with the main liquid chamber 62a, and an elastic movable membrane 65 provided on the dividing member 63 and used for absorbing fluctuations in liquid pressure. An operating liquid Lq is sealed in the main liquid chamber 62a and the auxiliary liquid chamber 62b.

The structure for attaching the engine 41 to the subframe 30 via the vibration isolation device 50 is described in detail below.

The subframe 30 has a fitting hole 31 at the position at which the vibration isolation device 50 is attached. The fitting hole 31 passes through the subframe 30 in the vertical direction.

The fitting hole 31 is constructed of a large-diameter hole 31a formed in the lower side of the subframe 30 and a small-diameter hole 31b formed in the upper side of the subframe 30. The diameter of the large-diameter hole 31a is larger than the diameter of the small-diameter hole 31b. A step 31c therefore exists at the border between the large-diameter hole 31a and the small-diameter hole 31b. Hereinafter, the step 31c is referred to as the positioning step 31c. The insertion depth of the second attachment part 52 is determined by the positioning step 31c. The position (depth) of the positioning step 31c relative to a lower surface 32 of the subframe 30 is preset.

The second attachment part 52 is attached to the fitting hole 31 by detachable press-fitting. Specifically, the second attachment part 52 is press-fitted to the large-diameter hole 31a in the fitting hole 31 from below the subframe 30.

Here, "attached by detachable press-fitting" refers to attaching and fitting the second attachment part 52 to the fitting hole 31 to a detachable extent using a tool. Specifically, this refers to fitting to an extent at which self-holding is possible without the second attachment part 52 dropping out from the fitting hole 31 at a vibration extent transmitted from the outer part to the subframe 30. In this way, the load for attaching the second attachment part 52 to the fitting hole 31 by press-fitting is a load applied to the extent at which the second attachment part 52 can be detached from the fitting hole 31.

The second attachment part 52 has a positioning stopper 52a on the upper end. The positioning stopper 52a is used to position the press-fitting direction (upward direction) relative to the subframe 30 when the second attachment part 52 is press-fitted into the fitting hole 31, and is integrally formed, for example, on the upper edge of the second attachment part 52. The attaching position of the second attachment part 52 relative to the subframe 30 is determined by the positioning stopper 52a coming into contact with the positioning step 31c.

The subframe 30 has a cover 35 capable of blocking the lower opening of the fitting hole 31 and the entire lower end of the vibration isolation device 50. The cover 35 is a substantially plate-shaped member detachably attached to the lower surface 32 of the subframe 30 by a plurality of bolts 36. The inner surface of the cover 35 attached to the subframe 30 is adjacent to the lower end of the second attachment part 52. Such a cover 35 is referred to as the "retaining stopper 35" below, where the second attachment part 52 press-fitted into the fitting hole 31 is retained in the direction (downward direction) opposite to the press-fitting direction by the cover 35.

In this way, falling off of the second attachment part 52 in a direction opposite to the press-fitting direction relative to the fitting hole 31 is prevented by the retaining stopper 35. The second attachment part 52 is therefore prevented from falling off from the fitting hole 31 by the vibrations generated by the engine 41 and the vibrations generated during the running of the vehicle 10. Accordingly, the state of attachment of the vibration isolation device 50 to the subframe 30 can be maintained for a longer period of time.

The first attachment part 51 protrudes above the subframe 30, and one end part of a stud bolt 54 is embedded in the upper end surface of the attachment part. The stud bolt 54 is positioned on the axis CL of the vibration isolation device 50, and extends upward. The engine 41 (more specifically, the engine bracket 41a) stacked on the first attachment part 51 is detachably attached to the first attachment part 51 by the stud bolt 54 and a nut 55.

In FIG. 3, the member 38 indicated by an imaginary line is a lateral-runout stopper for the first attachment part 51. The lateral-runout stopper 38 is used to restrict the amount of displacement by which the first attachment part 51 is displaced in the horizontal direction when the vehicle 10 (FIG. 1) quickly accelerates and decelerates, and is attached, for example, above the subframe 30.

An example of a maintenance procedure for the vibration isolation device 50 is described below.

The subframe 30 is in a state in which the engine 41 is mounted via the vibration isolation device 50, as shown in FIG. 3. To maintain the vibration isolation device 50 in this state in good condition, the nut 55 is first separated from the stud bolt 54, and the lateral-runout stopper 38 is separated from the subframe 30. The retaining stopper 35 is then separated from the subframe 30, and the second attachment part 52 is extracted downward from the fitting hole 31. As a result, the vibration isolation device 50 can be detached from the fitting hole 31.

After the vibration isolation device 50 has been serviced and inspected, the device is again returned to the fitting hole 31 or replaced with a new vibration isolation device 50. The specific procedure involves first inserting the vibration isolation device 50 into the fitting hole 31 from below the subframe 30, and press-fitting the second attachment part 52 to the large-diameter hole 31a. The positioning stopper 52a comes into close contact with the positioning step 31c of the subframe 30 when the second attachment part 52 is press-fitted to the fitting hole 31 up to a certain preset position. As a result, the press-fitting direction of the second attachment part 52 is positioned relative to the subframe 30, as shown in FIG. 3.

The operator need not pay attention to the position of the press-fitting direction relative to the subframe 30 when the second attachment part 52 is press-fitted into the fitting hole 31. The vibration isolation device 50 can therefore be made easier to maintain in good condition.

The position of the engine 41 is not changed from the original position relative to the subframe 30. The upper end part of the stud bolt 54 therefore fits in a bolt hole of the engine bracket 41a when the press-fitting direction of the second attachment part 52 is positioned relative to the subframe 30. The lateral-runout stopper 38 is subsequently attached to the subframe 30, and the engine bracket 41a is attached to the first attachment part 51 by screwing the nut 55 onto the stud bold 54. The retaining stopper 35 is then attached to the subframe 30 to complete the series of maintenance operations.

The following is a summary of the above explanation.

The second attachment part 52, which is used to attach the vibration isolation device 50 to the subframe 30, is attached to the fitting hole 31, which is formed in a vertical direction of the subframe 30, by press-fitting with a detachable load from below. In this way, the second attachment part 52 is merely attached to the fitting hole 31 of the subframe 30 by direct press-fitting, and less time is therefore required to install and dismantle the subframe 30 on the vehicle body frame 20 as part of the maintenance operation involved in servicing, inspecting, and replacing the vibration isolation device 50. As a result, the vibration isolation device 50 can be maintained in good condition with greater ease.

Moreover, an attachment base for attaching the vibration isolation device 50 to the subframe 30 is unnecessary because the second attachment part 52 is merely attached to the fitting hole 31 of the subframe 30 by direct press-fitting. Nor is it necessary for the second attachment part 52 to have a flange for attaching the device (bracket for mounting the vibration source) to the attachment base by bolting. The subframe 30 and the vibration isolation device 50 can be made proportionally more lightweight. In addition, the attachment base and the flange are thus dispensed with, and hence these members cannot cause resonance or vibrational amplification. Accordingly, the resonance and vibrational amplification of the subframe 30 and its periphery can be minimized for the vibrations generated by the engine 41 (vibration source).

The engine 41 can be greatly displaced in the vertical direction, that is, the direction along the axis CL of the vibration isolation device 50, during quick acceleration or deceleration of the vehicle 10 (FIG. 1). The lower surface of the engine bracket 41a can strike the upper surface of the vibration isolation device 50 when the amount of displacement is excessive. A downward load from the engine bracket 41a acts on the vibration isolation device 50 when the device is struck. This downward load is a force acting in a direction in which the vibration isolation device 50 is caused to fall downward off from the fitting hole 31 of the subframe 30.

In response to this, a cushioning member 39 is preferably disposed with a constant gap δ between the upper surface of the lateral-runout stopper 38 and the lower surface of the engine bracket 41a, as shown in FIG. 3. The cushioning member 39 is formed from a rubber attached to, for example, the upper surface of the lateral-runout stopper 38. The cushioning member 39 may also be a structure disposed between the upper surface of the subframe 30 and the lower surface of the engine bracket 41a.

The size of the gap δ and the thickness of the cushioning member 39 are set according to the downward load so that the downward load can be stopped by the cushioning member 39 without the lower surface of the engine bracket 41a striking the upper surface of the vibration isolation device 50. The downward load is therefore mitigated by the cushioning member 39 and is stopped by the lateral-runout stopper 38 or the subframe 30. Accordingly, in cases in which the engine 41 is greatly displaced toward the vibration isolation device 50, the downward load is prevented from acting on the upper surface of the vibration isolation device 50 by the engine bracket 41a striking the upper surface of the cushioning member 39. The vibration isolation device 50 is prevented from falling downward off from the fitting hole 31 of the subframe 30. The state of attachment of the vibration isolation device 50 to the subframe 30 can be maintained over a longer period of time.

Second Embodiment

Figure 4:
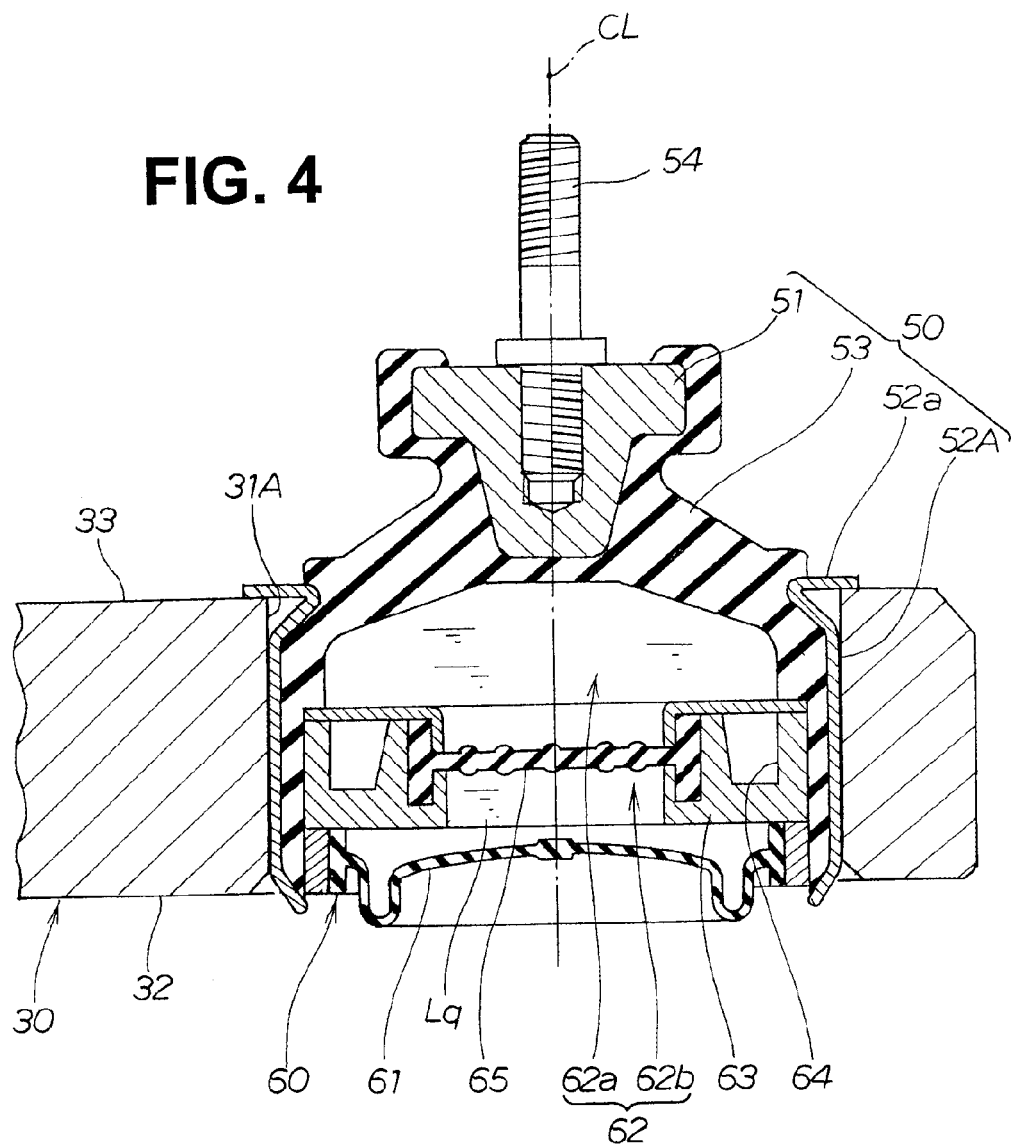
FIG. 4 is a cross-sectional view of the periphery of a vibration isolation device according to a second embodiment of the present invention.

A second embodiment is described below with reference to FIG. 4. These parts that are the same as those in the first embodiment are marked with the same reference characters, and the descriptions thereof are omitted. FIG. 4 shows an area surrounding a vibration isolation device (second embodiment) according to the present invention and provides a depiction that corresponds to the aforementioned FIG. 3. However, the lateral-runout stopper 38, the engine bracket 41a, and the nut 55 shown in FIG. 3 are omitted.

The second embodiment is substantially the same structure as the first embodiment, but the following aspects are different. Specifically, the first embodiment shown in FIG. 3 is a structure in which the second attachment part 52 is attached to the fitting hole 31 "from below." In contrast, the second embodiment shown in FIG. 4 is different in the aspect of having a structure in which a second attachment part 52A is attached to a fitting hole 31A by press-fitting a detachable load "from above." The differences are described in detail below.

The fitting hole 31A of the second embodiment shown in FIG. 4 corresponds to the fitting hole 31 of the first embodiment shown in FIG. 3. The fitting hole 31 of the first embodiment is a stepwise hole formed from the large-diameter hole 31a, the small-diameter hole 31b, and the step 31c. In contrast, the fitting hole 31A of the second embodiment is a through-hole vertically passing through in a stepless straight shape. The diameter of the fitting hole 31A is set to the same diameter as that of the large-diameter hole 31a of the first embodiment.

Moreover, the second attachment part 52A of the second embodiment shown in FIG. 4 corresponds to the second attachment part 52 of the first embodiment shown in FIG. 3. The outside diameter of the second attachment part 52A is set to the same outside diameter as that of the second attachment part 52 of the first embodiment.

In the first embodiment, the positioning stopper 52a provided on the second attachment part 52 determines the attachment position of the second attachment part 52 relative to the subframe 30 by coming into contact with the positioning step 31c of the fitting hole 31. The outside diameter of the positioning stopper 52a is slightly smaller than the diameter of the large-diameter hole 31a.

In contrast, in the second embodiment, the positioning stopper 52a provided at an upper end of the second attachment part 52A determines the attachment position of the second attachment part 52A relative to the subframe 30 by coming into contact with the upper surface 33 of the subframe 30. The outside diameter of the positioning stopper 52a of the second embodiment is set larger than the diameter of the fitting hole 31A.

The positioning stopper 52a thus comes into contact with the upper surface 33 of the subframe 30 when the second attachment part 52A is press-fitted into the fitting hole 31A in the downward direction from above up to a preset constant position. As a result, the second attachment part 52A can be positioned in the press-fitting direction (downward direction) relative to the subframe 30, as shown in FIG. 4. The operator need not pay attention to the position of the press-fitting direction relative to the subframe 30 when the second attachment part 52A is press-fitted into the fitting hole 31A. The vibration isolation device 50 can therefore be maintained in good condition with greater ease.

The positioning stopper 52a of the second embodiment has the dual role as a retaining stopper for preventing the attachment part from dropping out of the subframe 30. Because the positioning stopper 52a comes into contact with the upper surface 33 of the subframe 30, the second attachment part 52A can be restricted more securely in its tendency to drop down from the fitting hole 31A. The retaining stopper 35 shown in FIG. 3 can therefore be dispensed with.

As described above, in the vibration isolation device 50 of the second embodiment, the second attachment part 52A for attaching the device to the subframe 30 is attached, by detachable press-fitting from above, to the fitting hole 31A formed in a vertical direction of the subframe 30. The second attachment part 52A is thus merely attached to the fitting hole 31A of the subframe 30 by direct press-fitting, and less time is therefore required to install and dismantle the subframe 30 on the vehicle body frame 20 as part of the maintenance operation involved in servicing, inspecting, and replacing the vibration isolation device 50. As a result, the vibration isolation device 50 can be maintained in good condition with greater ease.

Moreover, an attachment base for attaching the vibration isolation device 50 to the subframe 30 is unnecessary because the second attachment part 52A is merely attached to the fitting hole 31A of the subframe 30 by direct press-fitting. Nor is it necessary for the second attachment part 52A to have a flange for attaching the device (bracket for mounting the vibration source) to the attachment base by bolting. The subframe 30 and the vibration isolation device 50 can be made proportionally more lightweight. In addition, the attachment base and the flange are thus dispensed with, and hence these members cannot cause resonance or vibrational amplification. Accordingly, the resonance and vibrational amplification of the subframe 30 and its periphery can be minimized for the vibrations generated by the engine 41 (vibration source).

In the present invention, the vehicle body 11 may also be a structure in which the subframe 30 is attached to the back part of the vehicle body frame 20.

The vibration source may be any source producing motive power for propulsion, and may also be, for example, an electric motor in addition to the engine 41 or the transmission 42.

INDUSTRIAL APPLICABILITY

The vibration source attachment structure of the present invention can be used in an automobile in which an engine 41 or other vibration source is attached via a vibration isolation device 50 to a subframe 30 attached to a vehicle body frame 20 from below.

REFERENCE SIGNS LIST

10 Vehicle
20 Vehicle body frame
30 Subframe
31, 31A Fitting hole
31c Positioning step 32 Lower surface
33 Upper surface
35 Retaining stopper
41 Vibration source (engine)
41a Engine bracket
50 Vibration isolation device
51 First attachment part
52, 52A Second attachment part
52a Positioning stopper
53 Elastic body
Up, Dw Press-fitting direction

The invention claimed is:

1. A vibration source attachment structure comprising a vehicle body frame, a subframe disposed below the vehicle body frame and attached to the vehicle body frame, and an engine or other vibration source attached to the subframe via a vibration isolation device, characterized in that:

the vibration isolation device has a first attachment part attached to the vibration source, a second attachment part attached to the subframe, and an elastic body connecting the first attachment part and the second attachment part;

the subframe has a fitting hole formed in a vertical direction of the subframe; and the second attachment part is attached to the fitting hole by detachable press-fitting from either below or above, wherein the second attachment part is directly press-fitted to the fitting hole in the subframe, wherein the second attachment part is a cylindrical member and has a positioning stopper integrally formed on an upper edge thereof for positioning the press-fitting direction relative to the subframe during press-fitting into the fitting hole, and wherein the positioning stopper includes a bent upper end portion of the second attachment part bent in a radially outward direction of the second attachment part, and the bent end portion extends in a direction substantially perpendicular to a vertical direction of the subframe.

2. The vibration source attachment structure according to claim 1, wherein the second attachment part is configured to be press-fitted into the fitting hole from below, and the subframe has a detachable retaining stopper for preventing the second attachment part press-fitted into the fitting hole from falling off in a direction opposite to the press-fitting direction.

3. The vibration source attachment structure according to claim 1, wherein the engine is attached to the subframe via the vibration isolation device, the engine has an engine bracket, and the first attachment part is attached to the engine bracket.

4. The vibration source attachment structure according to claim 1, wherein the subframe fitting hole has a positioning step defined along a surface thereof, and the positioning stopper is engaged with the positioning step to position the second attachment part relative to the subframe.

5. The vibration source attachment structure according to claim 4, wherein the second attachment part is configured to be press-fitted in the fitting hole from below, and the subframe has a detachable retaining stopper for preventing the second attachment part press-fitted into the fitting hole from falling off in a direction opposite to the press-fitting direction.

6. The vibration source attachment structure according to claim 1, wherein the fitting hole has a uniform diameter throughout the length thereof, the second attachment part is configured to be press-fitted in the fitting hole from above, and the bent end portion of the second attachment part is engaged with an upper surface of the subframe.

* * * * *